United States Patent [19]
Zimmer

[11] 3,970,580
[45] July 20, 1976

[54] METHOD OF MAKING SPHERICAL METALLIC OXIDE AND METALLIC CARBIDE PARTICLES

[75] Inventor: Erich Zimmer, Julich, Germany

[73] Assignee: Kernforschungsanlage Julich Gesellschaft mit beschrankter Haftung, Julich, Germany

[22] Filed: May 7, 1974

[21] Appl. No.: 467,728

[30] Foreign Application Priority Data
May 8, 1973 Germany............................ 2323010

[52] U.S. Cl............................. 252/301.1 S; 264/.5; 264/13; 264/125
[51] Int. Cl.²........................................... C09K 3/00
[58] Field of Search .............. 252/301.1 S; 423/256, 423/260; 264/.5

[56] References Cited
UNITED STATES PATENTS

| | | | |
|---|---|---|---|
| 3,290,122 | 12/1966 | Clinton | 264/.5 |
| 3,463,842 | 8/1969 | Flack et al. | 252/301.1 S |
| 3,812,049 | 5/1974 | Noothout et al. | 252/301.1 S |

OTHER PUBLICATIONS

Hawley, G. G. Ed. The Condensed Chemical Dictionary, Van Nostrand Reinhold Co., N.Y., 1971, p. 268, "Detergent."

Primary Examiner—Leland A. Sebastian
Assistant Examiner—Deborah L. Kyle
Attorney, Agent, or Firm—Walter Becker

[57] ABSTRACT

A method of making spherical metallic oxide and metallic carbide particles, especially particles consisting of fuel or breeder material for nuclear reactors such as oxide or carbide compounds of uranium, plutonium, thorium and the like with a diameter of from 0.1 to 1.5 millimeters, according to which an aqueous solution of a metallic nitrate or a metallic chloride or a mixture of metallic nitrates or metallic chlorides in which the metallic ions and anions are in a stoichiometric ratio to each other, is added dropwise to an organic phase. The method according to the invention is characterized primarily in that the drops formed from said aqueous solution after congealing, are washed in an aqueous solution containing ammonia and from 0.001% to 0.1% of a non-ionic surface active agent, especially an ethylene oxide condensate, enveloping said particles and preventing them from clumping during the following drying step, drying the thus hardened particles in an air current having a temperature of from 150° to 300°C and an atmospheric moisture content corresponding to the degree of saturation of the air at a temperature of about from 20° to 50°C, and sintering the thus dried particles at about 1300°C.

2 Claims, No Drawings

METHOD OF MAKING SPHERICAL METALLIC OXIDE AND METALLIC CARBIDE PARTICLES

The present invention relates to a method of making spherical metallic oxide or metallic carbide particles, of fuel or breeder materials for nuclear reactors, such as oxide or carbide compounds of uranium, plutonium, and thorium, or the like, which have a diameter of from 0.1 to 1.5 mm. According to this method, an aqueous solution of a metallic nitrate, or a metallic chloride, or a mixture of metallic nitrates or metallic chlorides, or a sol containing said metal oxides, is added dropwise to an organic phase above an aqueous ammonia solution. The molarity of the metallic ions is between 0.4 and 1.5. In order to form carbides, carbon in colloidal form is added to the aqueous solution or sol, and the then formed carbon containing oxide particles are heated. A ketone or ketone mixture is used as the organic phase, which at room temperature has a dissolving power for water up to about 4 percent by weight and has a viscosity between one half and twice that of water.

It is known to cure or aftertreat hardened particles from aqueous solutions of heavy metal compounds or sols by washing them in solvents, such as isopropylalcohol, which are miscible in water, and subsequently to dry and sinter them. A drawback of this method consists in that the media used for washing are relatively expensive. In addition, it was necessary to take safety precautions because of the flammability of the solvent. It is also known to dry the hardened or solidified particles with superheated steam. This method is also relatively expensive.

It is an object of the present invention to improve the known methods of producing the above described particles.

It is a further object of the present invention to provide a substantially simpler and more economic curing of such particles.

With these and other objects in view, the method according to the present invention is characterized primarily in that the drops formed from the aqueous solution, after congealing, are washed in an aqueous solution containing ammonia as well as from 0.001 to 0.1% of a non-ionic surface active agent such as an ethylene oxide condensate or the like, which covers the particles and prevents them from clumping during the drying step. Subsequently thereto, the hardened particles are dried in an air stream having a temperature of from 150° to 300°C and an atmospheric moisture content which corresponds to the degree of saturation of the air at a temperature of about from 20° to 50°C. Thereupon, the dried particles, if necessary after reduction of the compound of the heavy metal contained in the aqueous solution, are sintered at about 1300°C.

EXAMPLE

One liter of a one-molaric solution of $TH(NO_3)4 \times 5H_2O$ in water was pre-neutralized by the addition of approximately 3.7 mol of ammonia in the form of concentrated ammonia water. Subsequently, the aqueous solution was dropwise added to an organic phase formed of methylisobutyl ketone, said organic phase forming a liquid layer within a reaction column above an aqueous ammonia solution. The particles formed in the reaction column by gelling were subsequently in a 1% ammonia water washed free of ammonium nitrate while to said last mentioned wash water there was added 0.01% by weight of an ethylene oxide condensate as surface active agent. As surface active agent in the wash water also sorbitanmonooleate may be successfully employed. Subsequently, the particles were dried in an air stream heated to a temperature of 150°C which air stream was saturated with water at a temperature of 40°C. Subsequently the particles were sintered at a temperature of 1300°C. The uniformly shaped particles prepared in conformity with this method and having a ball diameter of approximately 0.8 millimeter had a sufficiently high density which met all requirements of high temperature reactors.

It is, of course, to be understood that the present invention is, by no means, limited to the specific method set forth above, but also comprises any modifications within the scope of the appended claims.

What I claim is:

1. A method of making spherical metallic oxide and metallic carbide particles of fuels and breeding material for nuclear reactors, such as oxide or carbide compounds which have a diameter of from 0.1 to 1.5 millimeters, which includes in combination the steps of: dropwise adding to an organic phase above an aqueous solution of ammonia a substance selected from the group consisting of an aqueous solution of a metallic nitrate, a metallic chloride, a mixture of metallic nitrates, a mixture of metallic chlorides or a sol containing said metal oxides, the molarity of said metallic ions being between 0.4 and 1.5, and said carbides being formed by adding carbon in colloidal form to said aqueous solution or sol and then sintering the carbon containing oxide particles, while employing as organic phase a substance selected from the group consisting of a ketone or a ketone mixture which at room temperature has a solubility for water up to about 4% by weight and has a viscosity between one half and twice that of water, washing the drops formed from said aqueous solution after they have congealed in an aqueous solution containing ammonia and from 0.001% to 0.1% of a non-ionic surface active agent, such as an ethylene oxide condensate which envelops said particles and prevents them from clumping during the drying step, drying the particles in an air current having a temperature of from 150° to 300°C and an atmospheric moisture content corresponding to the degree of saturation of the air at a temperature of about from 20° to 50°C, and sintering the thus dried particles at about 1300°C.

2. A method according to claim 1, which includes the step of reducing the compound of the heavy metal in said aqueous solution prior to sintering said dried particles.

* * * * *